March 26, 1940.    G. V. MABRITO    2,195,178
AUTOMATIC BRAKE ADJUSTMENT
Filed June 26, 1939
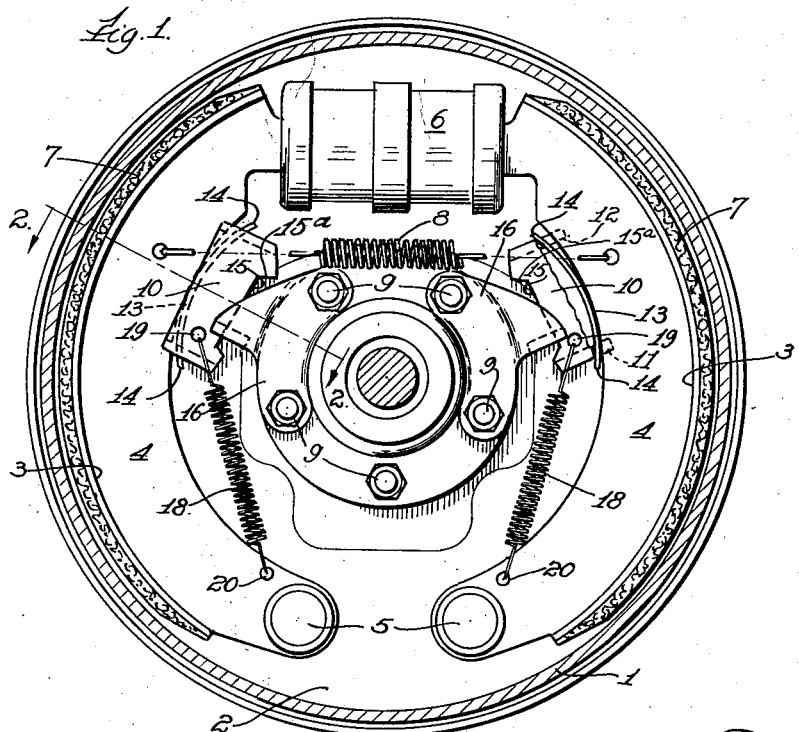
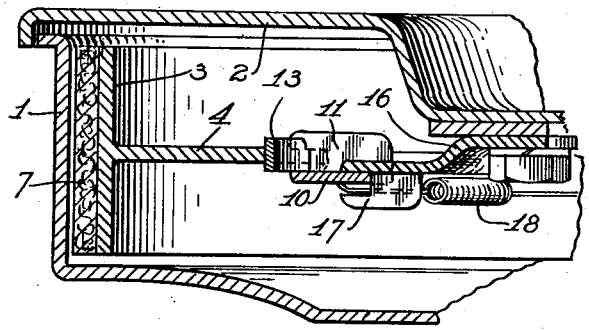
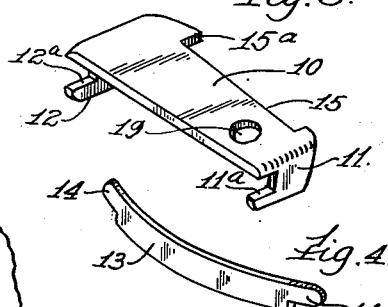
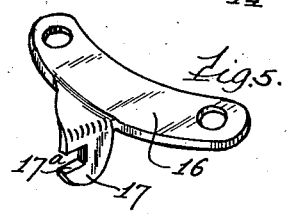
Inventor:
Guido V. Mabrito
by
his Attorneys.
Witness Patented Mar. 26, 1940

2,195,178

UNITED STATES PATENT OFFICE 2,195,178

AUTOMATIC BRAKE ADJUSTMENT

Guido V. Mabrito, Chicago, Ill.

Application June 26, 1939, Serial No. 281,178

10 Claims. (Cl. 188—79.5)

This invention relates to vehicle brakes, and particularly to the type designed for automotive use. One object of the invention is to provide means for adjusting the brake shoes automatically to compensate for wear of the brake linings so as to maintain a substantially uniform operating clearance at all times. Another object is to provide a simple and dependable mechanism which shall be economical to manufacture and which may be readily installed in existing mechanisms of conventional type without undue alteration of the same. A further object is to provide a device in which a minimum of variation is required to adapt it to brake structures of different dimensions and designs. The invention consists in certain features and elements of construction as herein shown and described and as indicated by the claims.

In the drawing:

Fig. 1 is a vertical section of a conventional automobile brake showing the brake shoes and operating means therefor, together with elements constituting this invention as applied thereto.

Fig. 2 is a partial transverse section taken radially as indicated at line 2—2 on Fig. 1.

Fig. 3 is a perspective view of the wedge member of the adjusting device.

Fig. 4 is a perspective view of the spring bearing member for the wedge.

Fig. 5 is a perspective view of the abutment member for the adjusting device.

In the conventional brake structure chosen for purposes of illustration the brake drum 1, which may be understood as carried by the vehicle wheel, is shown with its flange adjacent the fixed anchor plate 2, upon which the brake mechanism is mounted. This mechanism includes brake shoes 3 having web portions 4 which are pivoted at 5 upon the anchor plate 2. A hydraulic cylinder is shown at 6, arranged for operating the brake shoes to press their friction linings 7, into contact with the brake drum 1 in the usual manner. A retracting spring 8 is conveniently arranged with its ends connected to the webs 4 of the two brake shoes so as to draw them out of contact with the drum 1 when the actuating pressure is released. The anchor plate is secured to the fixed axle structure by means of the usual bolts 9.

It is desirable to maintain a uniform, normal clearance between the friction linings 7 and the opposing surface of the brake drum 1, so that the operating movement of the brake pedal shall remain uniform and within safe limits. For this purpose each brake shoe is provided with an automatic adjusting device which includes a wedge member 10 having a transversely extending portion 11 at one end and a transversely extending portion 12 at the other end, with notches 11a and 12a formed in said portions respectively so that these notches may engage or straddle the curved inner edge of the web 4 of the brake shoe. However, the notches do not bear against the brake shoe web because the member 10 carries a curved spring 13 whose end portions 14 engage respectively in the notches 11a and 12a, while a convex face portion of the curved spring bears against the edge of the web 4. The opposite edge 15 of the wedge member bears against an abutment member 16, which is anchored fixedly by two of the bolts 9 and which is formed with a bent lug 17 having at notch 17a into which the edge 15 of the wedge member 10 fits slidably. A light spring 18 extends from a hole 19 in the wedge member 10 to a hole 20 in the web of the brake shoe so as to exert a constant force longitudinally of the wedge member.

When not under stress the spring member 13 is curved somewhat more sharply than the contour of the inner edge of the brake shoe web 4, but when it is installed in the wedge member 10 and in contact with the web of the brake shoe, the spring 13 will be flexed by the tension of the spring 8 until it conforms to the curvature of the edge of the web 4. Then, as the brakes are applied, the spring 13 will tend to assume its normal curvature with only part of its length in contact with the edge of the web 4. Such contact will be maintained if the movement of the brake shoe, as it is applied against the drum 1, does not exceed a predetermined amount, say, about one thirty-second of an inch. But when the brake lining 1 becomes worn so as to increase the amount of this clearance, it will be seen that the necessary movement of the brake shoe will carry the edge of the web 4 out of contact with the curved spring 13. This will permit the tension of spring 18 to slide the wedge member 10 in a direction to take up the increase clearance so that when the brakes are again released the shoe cannot move away from the drum 1 by more than the desired amount.

It will be noted that the pull of the spring 18 includes a component in the direction of convergence of the edge 15 of the wedge member 10, and the chord of the arc to which the curved spring member 13 conforms; in other words, the spring tends to urge a wider portion of the wedge between the notched abutment lug 17 and the curved edge of the web 4. And since this spring tension is exerted continuously, it will serve to shift the wedge 10 very gradually in response to the gradual wear of the brake lining 7.

In the construction illustrated both brake shoes are shown fitted with the compensating wedges 10 and related parts, which, however, operate independently of each other in accordance with the wear experienced by the individual brake linings 7 on the two brake shoes.

It will be evident that the parts 10 and 16 may be quite economically manufactured as stampings, castings or forgings, and that the part 7 may be of standard design, even though the contour and dimensions of the brake shoes to which it is applied may vary through considerable limits. The part 16 must, of course, be made to fit the particular anchor plate and the spacing of the bolts 9 which are to secure the member. And the spring members 13 will be carefully shaped so that the amount by which they must be flexed from normal curvature to conform to the shape of the edge of the web 4 shall correspond with the desirable amount of brake clearance; these spring members 13 may thus be made interchangeable in the notches of the wedge member 10 to adapt it to any particular design of brake shoe.

When the brakes are supplied with automatic adjusting devices embodying this invention the maintenance of a standard clearance will operate to equalize the braking action on all wheels of the vehicle, thus increasing the safety of operation of the vehicle.

As an additional safeguard, the wedge members 10 are formed with shoulders 15a, which will eventually encounter the lugs 17 as the wedges follow in the direction in which they are drawn by springs 18. The shoulders 15a thus define a limit beyond which the wear of the brake linings will not be taken up by the wedges 10, and at this point there will be no further compensation for wear of the brake lining and the operating pedal will require a longer stroke in applying the brakes. This will afford a definite warning to the driver that his brakes need relining, and this warning will come before the rivets or other metal parts of the brake shoes have begun to score the brake drum injuriously by direct contact therewith.

Thus the installation of these adjusting devices will protect the public by increasing the safety in operation of the vehicle; it will protect the owner of the vehicle against expensive repairs and replacements and against accidents which might occur by reason of faulty brakes; and it will rather tend to improve business in the repair and maintenance of brake linings in that the driver is duly warned of the need for replacement as it occurs, and is not so likely to continue using the brake linings after they have become excessively worn.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:

1. In a vehicle brake, in combination with a brake drum and a brake shoe which includes a flange to support a friction lining and a web with a concavely curved edge, a fixed abutment spaced from said edge of the web, a wedge interposed between said edge and the abutment, said wedge having a spring face normally of greater curvature than the edge of the web but yieldable to conform thereto and having its opposite face in slidable engagement with the abutment, said opposite face extending in convergent relation to the chord of that portion of the curved web which the spring face engages, and spring means urging said wedge in the direction of convergence of its said faces.

2. In the combination defined in claim 1, said spring face normally exerting sufficient friction against the edge of the brake shoe web and the abutment to oppose the force of said spring means and prevent movement of the wedge in the direction of convergence of its faces.

3. In the combination defined in claim 1, the deflection of said spring face from its normal curvature for conformity to the edge of the brake shoe affording a measure of permissible clearance between the brake shoe and the drum whereby, when such clearance is exceeded, the spring means shifts the wedge to take up the excess clearance.

4. In a vehicle brake, in combination with a brake drum and a brake shoe which includes a flange to support a friction lining and a web with a concavely curved edge, together with a retracting spring normally holding said brake shoe and its lining away from the drum, a fixed abutment spaced from said curved edge of the web, a wedge interposed between said edge and the abutment, said wedge having a spring face normally of greater curvature than the edge of the web but yieldable in response to the retracting spring to conform thereto and having its opposite face in slidable engagement with the abutment, and relatively light spring means tending to slide said face of the wedge along the abutment but normally prevented by the stress of the retracting spring.

5. In a vehicle brake, in combination with a brake drum and a brake shoe which includes a flange with a friction lining and a web with a concavely curved edge, a fixed abutment spaced from said edge of the web, a wedge interposed between said edge and the abutment, said wedge having transversely extending end portions notched to engage the web of the brake shoe, a curved spring member disposed with its end portions in said notches and with its intermediate arched portion bearing against the edge of said web, said spring being adapted to be flexed to conform to the curvature of said edge of the web, the wedge having an opposite face in engagement with the abutment, said face extending in convergent relation to a line connecting the bottoms of the notches in the ends of the wedge, and spring means urging the wedge in the direction of such convergence.

6. In the combination defined in claim 1, said abutment being formed as a lug having a notch into which the wedge fits, the notch serving to maintain the wedge in position as it is shifted in response to said spring means.

7. In a vehicle brake, in combination with a brake drum and a brake shoe having a flange with a friction lining and a web, a fixed abutment spaced from said edge of the web, and a wedge member interposed between said edge and the abutment, said wedge having a spring face whose normal contour is curved convexly toward the edge of the web, said face being yieldable to conform to said edge and the wedge having an opposite face in slidable engagement with the abutment, the spring face and said opposite face of the wedge extending convergently, spring means urging the wedge in the direction of convergence of said faces, and stop means disposed for limiting movement of the wedge in that direction.

8. In the combination defined in claim 1, said abutment being formed as a lug having a notch into which the wedge fits, the notch serving to maintain the wedge in position as it is shifted in response to said spring means, said wedge member having a stop shoulder positioned to engage the abutment lug for limiting movement of the wedge in the direction of convergence of its said faces.

9. In a vehicle brake, in combination with a brake drum and a brake shoe having a flange with a friction lining and a web, a fixed abutment spaced from said edge of the web and a wedge member interposed between said edge and the abutment, said wedge having a spring face whose normal contour is curved convexly toward the edge of the web, said face being yieldable to conform to said edge, and the wedge having an opposite face in slidable engagement with the abutment, the spring face and said opposite face of the wedge extending convergently, and spring means urging the wedge in the direction of convergence of said faces.

10. In a vehicle brake, in combination with a brake drum and a brake shoe having a flange with a friction lining and a web, a fixed abutment spaced from said edge of the web and a wedge member interposed between said edge and the abutment, said wedge having a spring face whose normal contour is curved convexly toward the edge of the web, said face being yieldable to conform to said edge, and the wedge having an opposite face in slidable engagement with the abutment, the spring face and said opposite face of the wedge extending convergently, and spring means urging the wedge in the direction of convergence of said faces, said wedge having transversely extending end portions notched to straddle the web of the brake shoe and the spring face of the wedge being formed as a separate curved spring member disposed with its end portions in said notches and with its intermediate arched portion bearing against the edge of the web, said abutment being formed as a lug having a notch which straddles the wedge at its said opposite face, whereby the notch of the abutment and the notches of the wedge serve to maintain the latter in position as it is shifted in response to said spring means.

GUIDO V. MABRITO.